United States Patent
Hussien et al.

(10) Patent No.: US 9,287,772 B2
(45) Date of Patent: Mar. 15, 2016

(54) VOLTAGE REGULATORS WITH IMPROVED STARTUP, SHUTDOWN, AND TRANSIENT BEHAVIOR

(71) Applicant: Vidatronic, Inc., College Station, TX (US)

(72) Inventors: Faisal Abdellatif Elseddeek Ali Hussien, Cairo (EG); Mohamed Mostafa Saber Aboudina, Giza (EG); Moises Emanuel Robinson, Austin, TX (US)

(73) Assignee: Vidatronic, Inc., College Station, TX (US)

(*) Notice: Subject to any disclaimer, the term of this patent is extended or adjusted under 35 U.S.C. 154(b) by 142 days.

(21) Appl. No.: 13/787,181

(22) Filed: Mar. 6, 2013

(65) Prior Publication Data

US 2014/0253072 A1  Sep. 11, 2014

(51) Int. Cl.

| | |
|---|---|
| G05F 1/00 | (2006.01) |
| H02M 3/156 | (2006.01) |
| H02M 1/36 | (2007.01) |
| H02M 1/088 | (2006.01) |
| H02M 3/157 | (2006.01) |
| H02M 1/00 | (2007.01) |

(52) U.S. Cl.
CPC .......... *H02M 3/156* (2013.01); *H02M 1/36* (2013.01); *H02M 1/088* (2013.01); *H02M 3/157* (2013.01); *H02M 2001/0025* (2013.01); *H02M 2001/0045* (2013.01)

(58) Field of Classification Search
USPC ......... 323/273, 274, 275, 276, 277, 278, 279, 323/280, 281, 282, 283, 288, 284, 901; 327/538, 539, 540, 541, 542, 543, 544
See application file for complete search history.

(56) References Cited

U.S. PATENT DOCUMENTS

| | | | |
|---|---|---|---|
| 7,157,892 B1* | 1/2007 | Ritter | 323/284 |
| 8,072,196 B1* | 12/2011 | Li | 323/266 |
| 2011/0140678 A1* | 6/2011 | Yee | 323/282 |

* cited by examiner

*Primary Examiner* — Nguyen Tran
(74) *Attorney, Agent, or Firm* — Osha Liang LLP

(57) ABSTRACT

A soft-start/soft-stop (SS) controller for a voltage regulator. The SS controller includes a power up/down detector configured to perform at least one selected from a group consisting of detecting a power on condition of the voltage regulator to determine a start-up time period and detecting a power off condition of the voltage regulator to determine a shut-down time period, and a ramped reference voltage signal generator configured to perform at least one selected from a group consisting of increasing a voltage level of a ramped reference voltage signal using a pre-determined ramp-up rate during the start-up time period and decreasing the voltage level of the ramped reference voltage signal using a pre-determined ramp-down rate during the shut-down time period, wherein the ramped reference voltage signal is supplied to the voltage regulator for controlling an output voltage level of the voltage regulator.

8 Claims, 12 Drawing Sheets

VOLTAGE REGULATORS WITH IMPROVED STARTUP, SHUTDOWN, AND TRANSIENT BEHAVIOR

BACKGROUND

DC-DC switching voltage regulator and Low Drop-Out (LDO) linear voltage regulator are types of voltage regulators. A Buck converter and a Boost converter are types of DC-DC switching voltage regulators. In particular, a Buck converter is a step-down voltage converter used when the output voltage is lower in magnitude than the input voltage (e.g., input is 3V and output is 1V), while a Boost converter is a step-up voltage converter used when the output voltage is higher in magnitude compared to the input voltage (e.g., input is 2V and output is 3.6V). Throughout this disclosure, the terms "voltage regulator," "voltage converter," "regulator," and "converter" may be used interchangeably depending on the context. Further, the terms "LDO linear voltage regulator" and "LDO" may be used interchangeably depending on the context.

Most voltage regulators share a special behavior during start-up (i.e., when the power supply is turned ON), shut-down (i.e., when the power supply is turned OFF or when the regulator is disabled) and during any transient activity (i.e., when spurious power supply disturbances occur) that requires output voltage adjustment. For example, if a DC-DC switching voltage regulator is turned ON in an uncontrolled fashion; the input current as well as the output voltage may behave in a way that can damage the regulator components/the load circuit. Similarly, during shut-down, regulator/load components can experience current/voltage stresses if the DC-DC switching voltage regulator does not include any proper current limiting circuitry. Typically, DC-DC switching voltage regulators have a controlled path between the output node and ground. This controlled path prevents any leakage current to ground and thus improves power efficiency. During any transient behavior that requires a discharge of the output node, this controlled path results in very long settling time for the output node voltage, especially for small current loads.

FIG. 1 shows a typical output voltage waveform (100) observed at an output terminal of a typical regulator during start-up without using proper voltage or current controller circuits. This typical voltage waveform (100) includes a fast ramping voltage rise (101) resulting in a voltage overshoot (102) that depends on the circuit loop dynamics of the regulator. Based on the load and its application, either of these two effects (fast ramping voltage and voltage overshoot) can damage external components that are specified to tolerate much lower voltage ratings for steady state operations.

Also, FIG. 1 shows a typical input current waveform (110) observed flowing into the output stage of a typical regulator during start-up without using proper protection circuits (e.g., voltage and current controller circuits). In this typical current waveform (110), the peak current (111) reaches much higher values than the targeted average load current (112). Since, a typical DC-DC switching voltage regulator has an off-chip output stage; such peak current (111) can destroy both bond wires and external components if not controlled properly. Proper choice of external components and bond wires to tolerate the peak current (111) without component damage will lead to a high-cost solution. Even with this costly solution, this peak current is withdrawn from a separate power supply supplying power to the regulator. Thus, this power supply needs to be designed to tolerate this large current (e.g., with small output impedance), otherwise the power input voltage at the power input terminal of the regulator may experience a drop that causes start-up failures.

FIG. 2 shows similar effects as the ones shown in FIG. 1, but for the shut-down process of a DC-DC switching voltage regulator. Similar precautions must be taken to avoid the damage of external components and bond wires.

During shut-down, a current discharge path controls the output voltage slew rate. During the discharge, the Buck converter behaves as a boost circuit causing a voltage peak on the power input terminal (i.e., a circuit node connected to the power output of a separate power supply). This peak can damage the Buck converter and any other circuit attached to the power output of the same power supply. A large input capacitor at the power input terminal may be used to solve this problem.

FIG. 3 shows the output voltage waveform (300) and the load current waveform (310) of a prior art regulator in a transient load test. The load current waveform (310) shows a negative step (311) corresponding to the output node voltage peak (301) that slowly settles back based on its discharge path. Many high-efficiency DC-DC switching voltage regulators maintain a weak/controlled discharge path to ground, thus forcing this output node voltage peak (301) to settle very slowly to a DC value.

Soft-start and soft-stop circuits are typical circuits that help prevent the voltage overshoots and current peaking that can damage the circuit during start-up and shut-down. They perform this function by controlling the voltage ramp on the output node. Different approaches are introduced in the literature to perform these functions. The key figures of merit for soft-start and soft-stop circuits are: 1) circuit area (e.g., smaller area is preferred), and 2) circuit static current (e.g., preferred to be inactive with low static current during normal operation to improve power efficiency).

In DC-DC switching voltage regulators, the output follows the reference input ($V_{ref}$). A common approach in soft-start architectures is to control the $V_{ref}$ ramp-up during start-up and thus controlling the output ramp irrespective of the loop speed.

FIG. 4 shows a prior art analog circuit (400) used to control the $V_{ref}$ ramp-up during start-up. In the circuit (400), a current source (401) and a capacitor (402) are used to generate a ramp voltage $V_{ramp}$ used as $V_{ref}$ during start-up. The capacitor (402) requires a very large capacitor value to achieve a start-up time in the hundred's of microseconds range. In most cases this capacitor (402) needs to be off-chip (external) leading to extra cost and an increase in printed circuit board (PCB) area. This solution cannot be used in low cost applications.

FIG. 5 shows a prior art digital circuit (500) used to control the $V_{ref}$ ramp-up during start-up. In the circuit (500), a digital-code word is generated and converted into an analog level $V_{ramp}$ through a digital-to-analog converter (DAC) (501). This output level $V_{ramp}$ is used as the reference voltage $V_{ref}$ for the DC-DC switching voltage regulator. Although this is a low-cost solution, this solution does not provide the functionality of the soft-stop circuit and any transient controllers.

SUMMARY

In general, in one aspect, the invention relates to a mostly-digital dual soft-start/soft-stop (SS) controller for a voltage regulator. The SS controller includes a power up/down detector configured to perform at least one selected from a group consisting of detecting a power on condition of the voltage regulator to determine a start-up time period and detecting a power off condition of the voltage regulator to determine a shut-down time period, and a ramped reference voltage signal generator configured to perform at least one selected from a group consisting of increasing a voltage level of a ramped reference voltage signal using a pre-determined ramp-up rate during the start-up time period and decreasing the voltage level of the ramped reference voltage signal using a pre-determined ramp-down rate during the shut-down time period, wherein the ramped reference voltage signal is supplied to the voltage regulator for controlling an output voltage level of the voltage regulator.

In general, in one aspect, the invention relates to a soft-start/soft-stop (SS) controller for a voltage regulator. The SS controller includes a power up/down detector configured to detect a power on condition of the voltage regulator to determine a start-up time period and detect a power off condition of the voltage regulator to determine a shut-down time period, and a variable on-resistance (Ron) controller configured to generate a Ron control signal to control a variable Ron of a MOS power switching device in the voltage regulator, wherein the MOS power switching device comprises a plurality of MOS switches, wherein the Ron control signal is configured to turn on each of the plurality of MOS switches in a first sequential order during the start-up time period of the voltage regulator and turn off each of the plurality of MOS switches in a second sequential order during the shut-down time period of the voltage regulator, and wherein the SS controller reduces at least one selected from a group consisting of overshoots of an output of the voltage regulator during the start-up time period, undershoots of the output during the shut-down time period, and an in-rush current of the voltage regulator during the start-up time period.

In general, in one aspect, the invention relates to a DC-DC switching voltage regulator (DDSVR). The DDSVR includes a first MOS power switching device comprising a plurality of MOS switches and configured to generate a VOUT output from a VIN input, a feedback control circuit coupled to the first MOS power switching device and configured to adjust a duty cycle of a gate control signal supplied to the first MOS power switching device for regulating a voltage level of the VOUT output, wherein the duty cycle is adjusted based on a difference between a reference voltage signal and a sample of the voltage level of the VOUT output, and a soft-start/soft-stop (SS) controller coupled to the first MOS power switching device and the feedback control circuit, and configured to generate a variable on-resistance (Ron) control signal to control a variable Ron of the first MOS power switching device, wherein the Ron control signal is configured to turn on each of the plurality of MOS switches in a first sequential order during the start-up time period of the DDSVR and turn off each of the plurality of MOS switches in a second sequential order during the shut-down time period of the DDSVR.

In general, in one aspect, the invention relates to a DC-DC switching voltage regulator (DDSVR). The DDSVR includes a first MOS power switching device configured to generate a VOUT output from a VIN input, a feedback control circuit coupled to the first MOS power switching device and configured to adjust a duty cycle of a gate control signal supplied to the first MOS power switching device for regulating a voltage level of the VOUT output, wherein the duty cycle is adjusted based on a difference between a reference voltage signal and a sample of the voltage level of the VOUT output, a VOUT glitch detector configured to generate a glitch-detected signal in response to detecting a glitch condition of the VOUT output, and a diode emulation circuit configured to suppress, subsequent to the start-up time period and prior to the shut-down time period, a leakage current path from the VOUT output to ground through a second MOS power switching device and enable the leakage current path to reduce a length of the shut-down time period.

In general, in one aspect, the invention relates to a DC-DC switching voltage regulator (DDSVR), The DDSVR includes a MOS power switching device configured to generate a VOUT output from a VIN input, a feedback control circuit coupled to the MOS power switching device and configured to adjust a duty cycle of a gate control signal supplied to the MOS power switching device for regulating a voltage level of the VOUT output, wherein the duty cycle is adjusted based on a difference between a ramped reference voltage signal and a sample of the voltage level of the VOUT output, and a soft-start/soft-stop (SS) controller coupled to the MOS power switching device and the feedback control circuit, and configured to generate the ramped reference voltage signal comprising a pre-determined ramp-up rate and a pre-determined ramp-down rate during a start-up time period and a shut-down time period, respectively, of the DDSVR.

In general, in one aspect, the invention relates to a Low Drop-Out (LDO) linear voltage regulator. The LDO linear voltage regulator includes a MOS power device configured to generate a VOUT output from a VIN input, an error amplifier coupled to the MOS power device and configured to generate an error signal supplied to the MOS power device for regulating a voltage level of the VOUT output, wherein the error signal is generated based on a difference between a ramped reference voltage signal and a sample of the voltage level of the VOUT output, and a soft-start/soft-stop (SS) controller coupled to the error amplifier and configured to generate the ramped reference voltage signal comprising a pre-determined ramp-up rate and a pre-determined ramp-down rate during a start-up time period and a shut-down time period, respectively, of the LDO linear voltage regulator.

In general, in one aspect, the invention relates to a Low Drop-Out (LDO) linear voltage regulator. The LDO linear voltage regulator includes a first MOS power switching device comprising a plurality of MOS switches and configured to generate a VOUT output from a VIN input, an error amplifier coupled to the MOS power device and configured to generate an error signal supplied to the MOS power device for regulating a voltage level of the VOUT output, wherein the error signal is generated based on a difference between a reference voltage signal and a sample of the voltage level of the VOUT output, and a soft-start/soft-stop (SS) controller coupled to the first MOS power switching device, and configured to generate a variable on-resistance (Ron) control signal to control a variable Ron of the first MOS power switching device, wherein the Ron control signal is configured to turn on each of the plurality of MOS switches in a first sequential order during the start-up time period of the LDO and turn off each of the plurality of MOS switches in a second sequential order during the shut-down time period of the LDO.

In general, in one aspect, the invention relates to a method to reduce output overshoots and undershoots in a voltage regulator. The method includes incrementing, based on a clock signal, an n-bit count value starting from a pre-determined minimum value and ending at a pre-determined maximum value, wherein the incrementing is initiated in response to detecting a power on condition of the voltage regulator, decrementing, based on the clock signal, the n-bit count value starting from the pre-determined maximum value and ending at the pre-determined minimum value, wherein the decrementing is initiated in response to detecting a power off condition of the voltage regulator, generating a voltage ramp that increases in proportion to the n-bit count value when the n-bit count value increments and decreases in proportion to the n-bit count value when the n-bit count value decrements, generating an up/down ramped reference voltage signal by selecting a time-dependent minimum of the voltage ramp and a DC reference voltage, wherein the up/down ramped reference voltage signal follows the voltage ramp incrementing until clipping at the DC reference voltage and follows the voltage ramp decrementing until clipping at a minimum voltage, and supplying the up/down ramped reference as a reference voltage to the voltage regulator for controlling an output voltage level of the voltage regulator.

Other aspects of the invention will be apparent from the following detailed description and the appended claims.

BRIEF DESCRIPTION OF DRAWINGS

The appended drawings are used to illustrate several embodiments of the invention and are not to be considered limiting of its scope, for the invention may admit to other equally effective embodiments.

DETAILED DESCRIPTION

Figure 1:
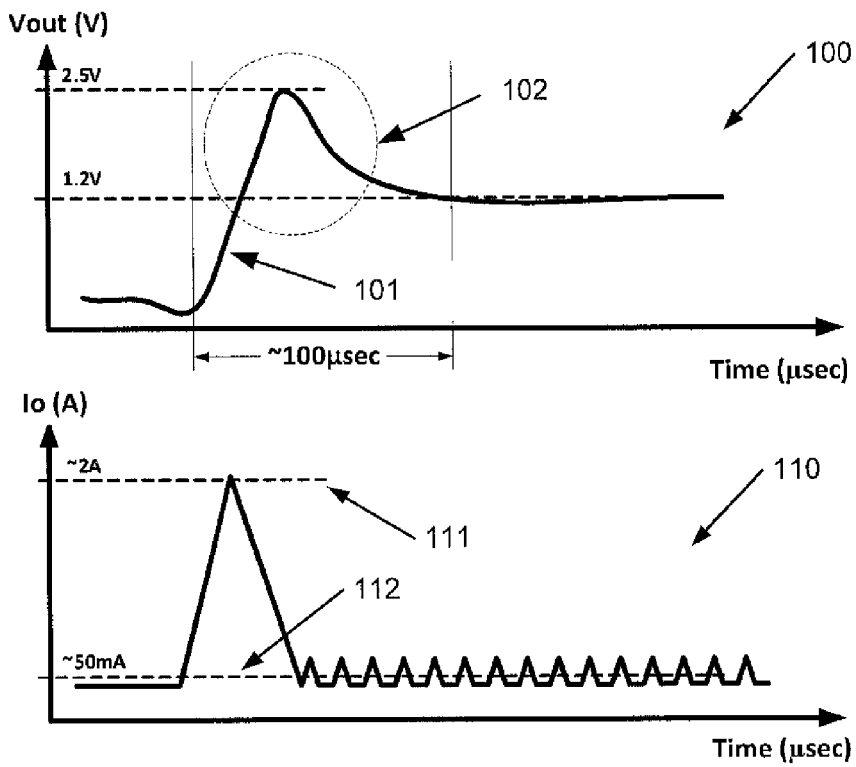
FIG. 1 shows a typical behavior of the voltage overshoot and the rush-in current ranges at the start-up of a prior art DC-DC switching voltage regulator in the absence of soft-start circuit and current limiting circuits.
Figure 2:
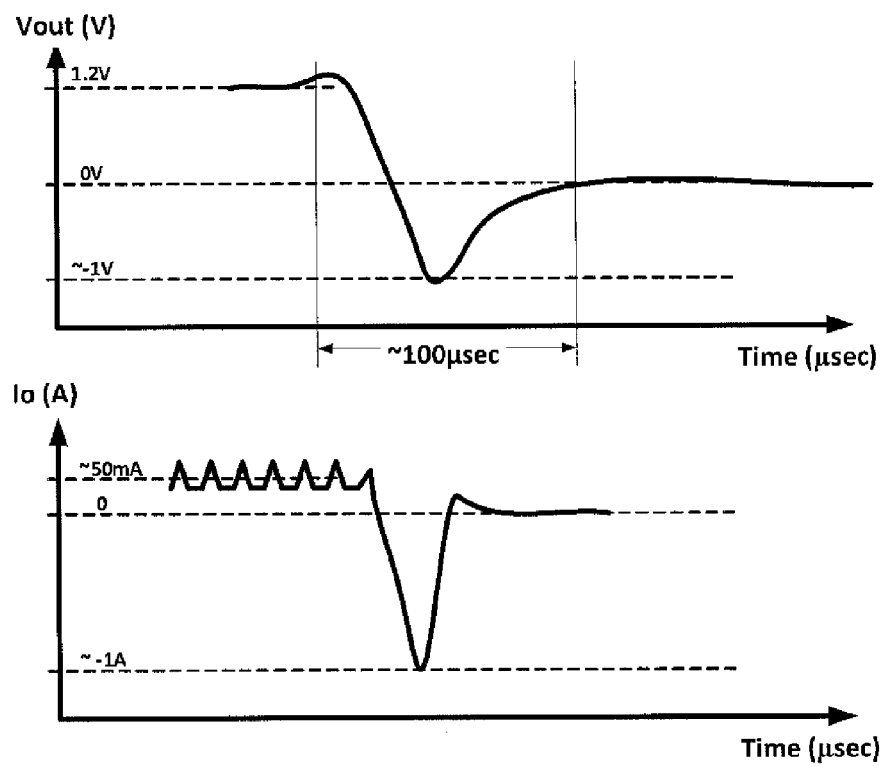
FIG. 2 shows a typical behavior of the voltage undershoots and the rush-in current ranges during shut-down of a prior art DC-DC switching voltage regulator in the absence of soft-stop circuit and current limiting circuits.

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Embodiments of the invention relate to an inventive soft-start and soft-stop circuit for a voltage regulator that reduces or otherwise controls voltage overshoots and peak currents. Accordingly, the output voltage slew rate is controlled during start-up and shut-down to decrease the stress on the external and internal components. Further, the current flowing into the output stage of the voltage regulator (rush-in current) is also controlled by controlling the output voltage slew rate.

In one or more embodiments of the invention, a mostly-digital dual soft-start/soft-stop solution with an analog output stage is used. In one or more embodiments, the soft-start and soft-stop circuits are implemented on a microchip, such as a semiconductor integrated circuit. In one or more embodiments, the inventive soft-start and soft-stop circuits are implemented in an LDO linear voltage regulator. In one or more embodiments, the inventive soft-start and soft-stop circuit are implemented in a DC-DC switching voltage regulator. Those skilled in the art, with the benefit of this disclosure will appreciate that the inventive soft-start and soft-stop circuit may also be used in other types of voltage regulator circuits.

Figure 6:
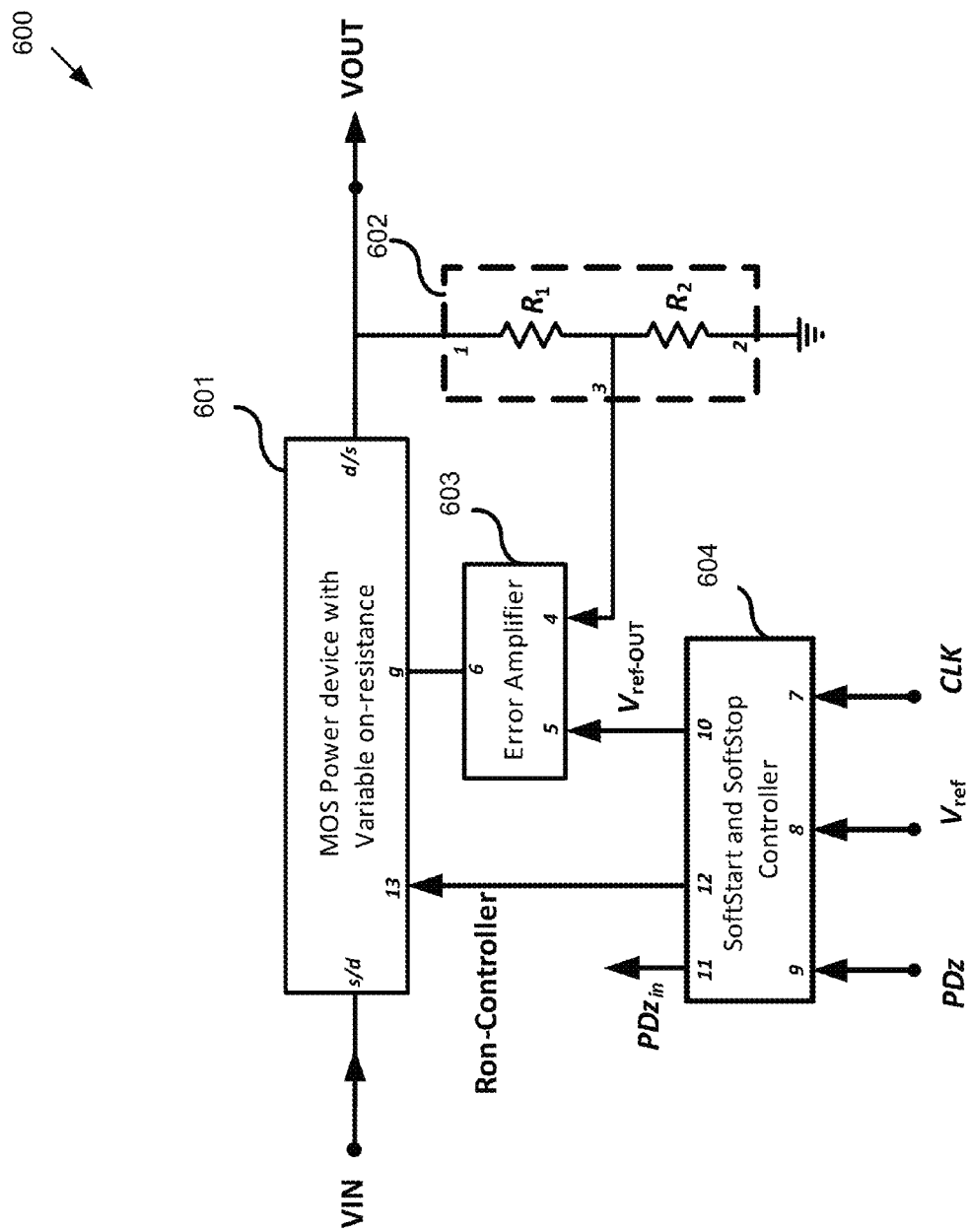
FIG. 6 shows the block diagram of an improved LDO linear voltage regulator in accordance with one or more embodiments of the invention.

FIG. 6 shows the block diagram of an improved LDO linear voltage regulator (600). In one or more embodiments of the invention, one or more of the modules and elements shown in FIG. 6 may be omitted, repeated/substituted. Accordingly, embodiments of the invention should not be considered limited to the specific arrangements of modules shown in FIG. 6.

In one or more embodiments, the improved LDO linear voltage regulator (600) includes a MOS power device (601) and it is configured to generate a VOUT output from a VIN input. The MOS power device (601) includes a number of smaller MOS devices connected in parallel.

In one or more embodiments, the improved LDO linear voltage regulator (600) includes an error amplifier (603) coupled to the MOS power device (601) and is configured to generate an error signal supplied to the MOS power device (601) for regulating a voltage level of the VOUT output, where the error signal is generated based on a difference between a ramped reference voltage signal (e.g., $V_{ref\text{-}OUT}$) and a sample of the voltage level of the VOUT output.

In one or more embodiments, the improved LDO linear voltage regulator (600) includes a soft-start/soft-stop (SS) controller (604) coupled to the MOS power device (601) and the error amplifier (603), and is configured to generate the ramped reference voltage signal (e.g., $V_{ref\text{-}OUT}$) that has a controlled ramp-up rate and a controlled ramp-down rate during a start-up time period and a shut-down time period, respectively, of the LDO linear voltage regulator (600).

In one or more embodiments, the SS controller (604) is further configured to generate a variable on-resistance (Ron) control signal to control a variable Ron of the MOS power device (601). In one or more embodiments, the Ron control signal is configured to turn ON each of the smaller MOS devices in a first sequential order during the start-up time period of the LDO linear voltage regulator, and turn OFF each of the smaller MOS devices in a second sequential order during the shut-down time period of the LDO linear voltage regulator.

In one or more embodiments, the improved LDO linear voltage regulator (600) includes additional components, such as a resistor network or other types of voltage divider to generate a sample of the voltage level of the VOUT output. Details of the operation of the circuit (600) are described below.

As shown in FIG. 6, the LDO has a main MOS power device (601) used to supply the output load with the required current maintaining the output voltage VOUT constant. It receives VIN at its input (s/d) and is connected to VOUT through its output (d/s). Its gate terminal (g) is controlled via a closed-loop system to provide DC accuracy and optimum transient behavior. Specifically, the closed-loop system includes a resistor ladder (602), an error amplifier (603), and the MOS power device (601) itself. The resistor ladder (602) is used to sample the output voltage VOUT for comparing to a constant reference voltage (Vref-OUT) using the error amplifier (603). This error amplifier (603) uses the error signal at its output (6) to control the gate terminal (g) of the MOS power device (601) to maintain the voltage accuracy of VOUT.

Figure 7:
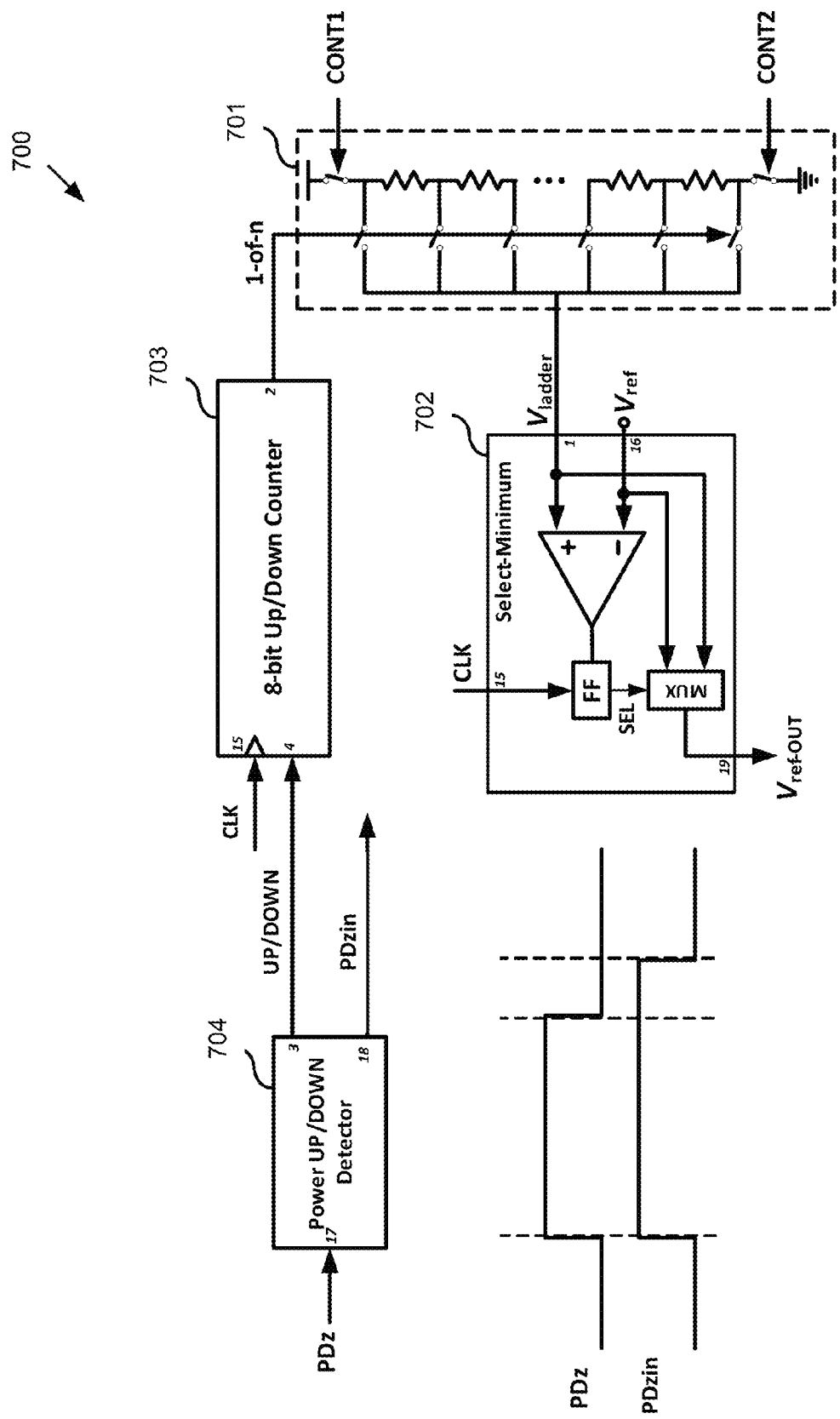
FIG. 7 shows a block diagram of a modified dual soft-start/soft-stop circuit in accordance with one or more embodiments of the invention.

Further as shown in FIG. 6, a soft-start/soft-stop controller (604) is used to ramp up $V_{ref\text{-}OUT}$ signal at its output (10) during start-up to reach a voltage level $V_{ref}$ supplied to its input (8), and ramp $V_{ref\text{-}OUT}$ down during shut-down from the voltage level $V_{ref}$ to zero. Also, the soft-start/soft-stop controller (604) is used to generate control signals Ron-Controller and PDzin at its outputs (12) and (11) during start-up and shut-down based on the input signal PDz supplied to its input (9). An example of the soft-start/soft-stop controller (604) is shown in FIG. 7. Those skilled in the art, with the benefit of this disclosure, will appreciate that other circuit implementations may also be used without deviating from the spirit of the invention.

Figure 11:
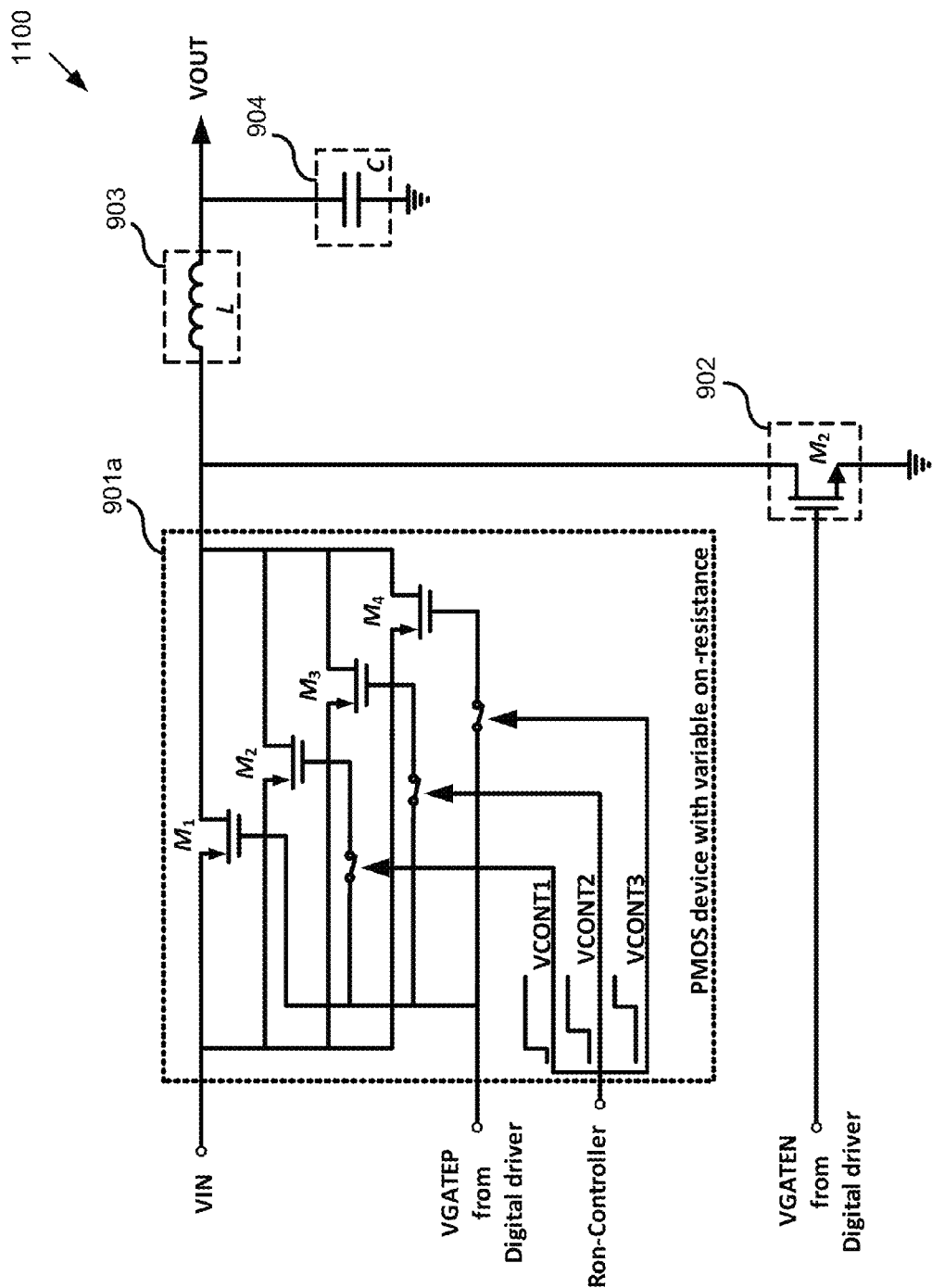
FIG. 11 shows an example circuit of a current limiting scheme in accordance with one or more embodiments of the invention.

In one or more embodiments, the MOS power device (601) includes a variable on-resistance to control the output current during start-up/shut-down. An example of implementing the variable on-resistance function is shown in FIG. 11. Those skilled in the art, with the benefit of this disclosure, will appreciate that other circuit implementations may also be used without deviating from the spirit of the invention.

FIG. 7 shows a schematic block diagram of a circuit (700), which is an example circuit implementation of the aforementioned soft-start and soft-stop controller (604) depicted in FIG. 6. In one or more embodiments of the invention, one or more of the modules and elements shown in FIG. 7 may be omitted, repeated/substituted. For example, in one or more embodiments, the circuit (700) may be configured to perform only the soft-start functionality but not the soft-stop functionality of the aforementioned soft-start and soft-stop controller (604), and vice versa. Accordingly, embodiments of the invention should not be considered limited to the specific arrangements of modules shown in FIG. 7.

In one or more embodiments, the circuit (700) includes a power up/down detector (704) that is configured to generate a power-up signal in response to detecting a power-on condition of the voltage regulator, and/or generate a power-down signal in response to detecting a power-off condition of the voltage regulator. In one or more embodiments, the power-up signal and the power-down signal are combined into a single signal, e.g., referred to as power up/down signal. In one or more embodiments, the power up/down signal indicates both the power-on condition and the power-off condition of the voltage regulator. In one or more embodiments, the power up/down signal only indicates the power-on condition but not the power-off condition of the voltage regulator. In such embodiments, the circuit (700) perform only the soft-start functionality but not the soft-stop functionality of the aforementioned soft-start and soft-stop controller (604). In one or more embodiments, the power up/down signal only indicates both the power-off condition but not the power-on condition of the voltage regulator. In such embodiments, the circuit (700) perform only the soft-stop functionality but not the soft-start functionality of the aforementioned soft-start and soft-stop controller (604).

In one or more embodiments, the circuit (700) includes an up/down counter (703) (e.g., an 8-bit counter) coupled to the power up/down detector (704) and configured to increment, based on a clock signal, the n-bit count value starting from a pre-determined minimum value, wherein the incrementing is initiated in response to a first pre-determined condition (e.g., a rising edge, falling edge, a maximum level, a minimum level, etc.) of the power up signal, hold the n-bit count value in response to the n-bit count value incrementing to a pre-determined maximum value, and decrement, based on the clock signal, the n-bit count value ending at the pre-determined minimum value, wherein the decrementing is initiated in response to a second pre-determined condition (e.g., a rising edge, falling edge, a maximum level, a minimum level, etc.) of the power down signal. As noted above, in one or more embodiments, the power up/down signal only indicates the power-on condition but not the power-off condition of the voltage regulator. In such embodiments, the up/down counter (703) may be reset instead of decrementing to the pre-determined minimum value upon detecting the power-off condition. Further, in one or more embodiments, the power up/down signal only indicates both the power-off condition but not the power-on condition of the voltage regulator. In such embodiments, the up/down counter (703) may be preset instead of incrementing to the pre-determined maximum value upon detecting the power-on condition.

In one or more embodiments, the circuit (700) includes a programmable voltage divider circuit (701) coupled to the up/down counter (703) and configured to generate a voltage ramp (e.g., $V_{ladder}$) that increases in proportion to the n-bit count value when the n-bit count value increments, and decreases in proportion to the n-bit count value when the n-bit count value decrements.

In one or more embodiments, the circuit (700) includes a select-minimum circuit (702) coupled to the programmable voltage divider circuit (701) and a DC-reference voltage source (e.g., $V_{ref}$), and configured to generate the ramped reference voltage signal by selecting a time dependent minimum of the voltage ramp and the DC-reference voltage, where the ramped reference voltage signal follows the voltage ramp until clipping at the DC reference voltage.

Details of the operation of the circuit (700) are described below.

During start-up, all circuit components of the circuit (700) start from a reset state dictated by a main Power-On-Reset block (not shown). Also, the output $V_{ladder}$ of the resistor ladder network (701) starts from zero when the electronic switch CONT1 is open and electronic switch CONT 2 is closed. The soft-start/soft-stop circuit (700) includes a power up/down detector (704) that detects the positive edge of the PDz signal supplied to its input (17). In response to detecting the positive edge of the PDz signal, the power up/down detector (704) sends an enable signal PDzin from its output (18) to the voltage regulator. In addition, the power up/down detector (704) sends an up/down signal from its output (3) to initiate the 8-bit up/down counter (703) to count up to ramp up $V_{ladder}$. The resistor segments of the resistor ladder network (701) and the clock speed of the clock signal CLK supplied to the input (15) of the 8-bit up/down counter (703) determines the incremental voltage step and the speed, respectively, in ramping $V_{ladder}$. A slow ramp speed is helpful for the output node safety and reliability, but it slows down the start-up time. This tradeoff can be adjusted based on the application and output components.

Figure 8:
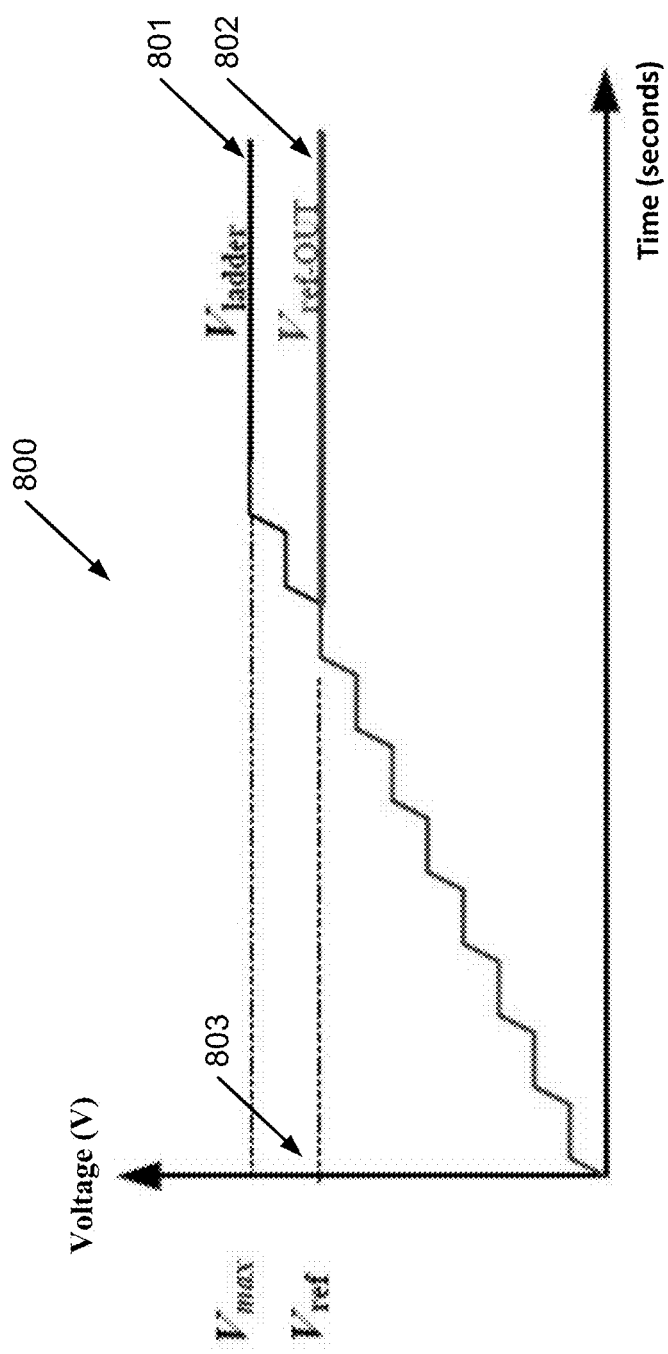
FIG. 8 shows a sketch of the internal node voltage $V_{ladder}$ and the output voltage $V_{ref\text{-}OUT}$ of the modified soft-start soft-stop circuit shown in FIG. 7.

As long as $V_{ladder}$ at the input (1) of the Select-Minimum block (702) is lower than $V_{ref}$ supplied to its input (16), $V_{ladder}$ is selected to propagate to the output (19) of the Select- Minimum block (702). As soon as $V_{ladder}$ exceeds $V_{ref}$, $V_{ref}$ is selected to propagate thus providing a constant $V_{ref}$ to the output (19) of the Select-Minimum block (702). At this point the soft-start process is completed. This process is shown in FIG. 8. The circuit (700) (i.e., an example of the aforementioned soft-start/soft-stop circuit) goes to a sleep mode preparing for soft-stop upon detecting a negative edge on the PDz signal supplied to the input (17) of the power up/down detector (704).

This sleep mode has zero power consumption (except for the comparator current of the Select-Minimum block (702), and the output $V_{ladder}$ of the resistor network ladder (801) goes to power supply voltage level VIN by closing the electronic switch CONT1 and opening the electronic switch CONT2. Upon receiving a negative edge on the up/down signal supplied to its input (4), the 8-bit up/down counter (703) starts counting down forcing the output $V_{ladder}$ of the resistor network ladder (801) to ramp down accordingly. The Select-Minimum block (702) selects the lower voltage present at its input (1) and input (16), thus leading to a slow ramp down. In one or more embodiments, the ramp-up and ramp-down are configured with the same or different speed based on the required application.

During this soft-stop time period, the voltage regulator (e.g., LDO shown in FIG. 6 or DC-DC switching regulator shown in FIG. 9) is completely functional and keeps tracking $V_{ref\text{-}OUT}$ while it discharges the output node VOUT slowly. After completely ramping down, the circuit (700) (i.e., an example of the aforementioned soft-start/soft-stop circuit) sends a disable command to the voltage regulator (e.g., LDO shown in FIG. 6 or DC-DC switching regulator shown in FIG. 9) to turn OFF and keeps the output node VOUT either floating or pulled low (VSS) depending on the application requirements. This is performed via sending a low state of the PDzin signal on its output (18).

The circuit (700) (i.e., an example of the aforementioned soft-start/soft-stop circuit) is tolerant to VIN glitches from the power supply. Specifically, after it executes a command, the circuit (700) ignores any successive edges until the process of start-up or shut-down is completed. This function makes the circuit (700) robust to any random pulses associated with PDz transitions that may be observed at input (17) of the power up/down detector (704).

In the soft-start process, the rush-in current (current flowing through the MOS power device (601) to the output node) is controlled indirectly via controlling the output voltage ramp. This indirectly reduces the rush-in current, but it still can exceed the load current limits. A direct current control mechanism is needed to accurately limit the rush-in current. In one or more embodiments, the rush-in current is reduced even more using a MOS power device with variable Ron. This is described later in the DC-DC switching voltage regulator example shown in FIG. 9.

FIG. 8 shows a diagram (800) illustrating the operation of the Select-Minimum block (702) depicted in FIG. 7. As shown in FIG. 8, voltage trace (801) represents the output $V_{ladder}$ generated by the resistor ladder network (701) shown in FIG. 7 and ramps from 0 to $V_{max}$ along the time axis during the soft-start time period. Further, voltage trace (802) represents the output $V_{ref\text{-}OUT}$ generated by the Select-Minimum block (702) shown in FIG. 7 and follows the voltage trace (801) until it reaches the voltage level (803) that represents $V_{ref}$ shown in FIG. 7.

Figure 9:
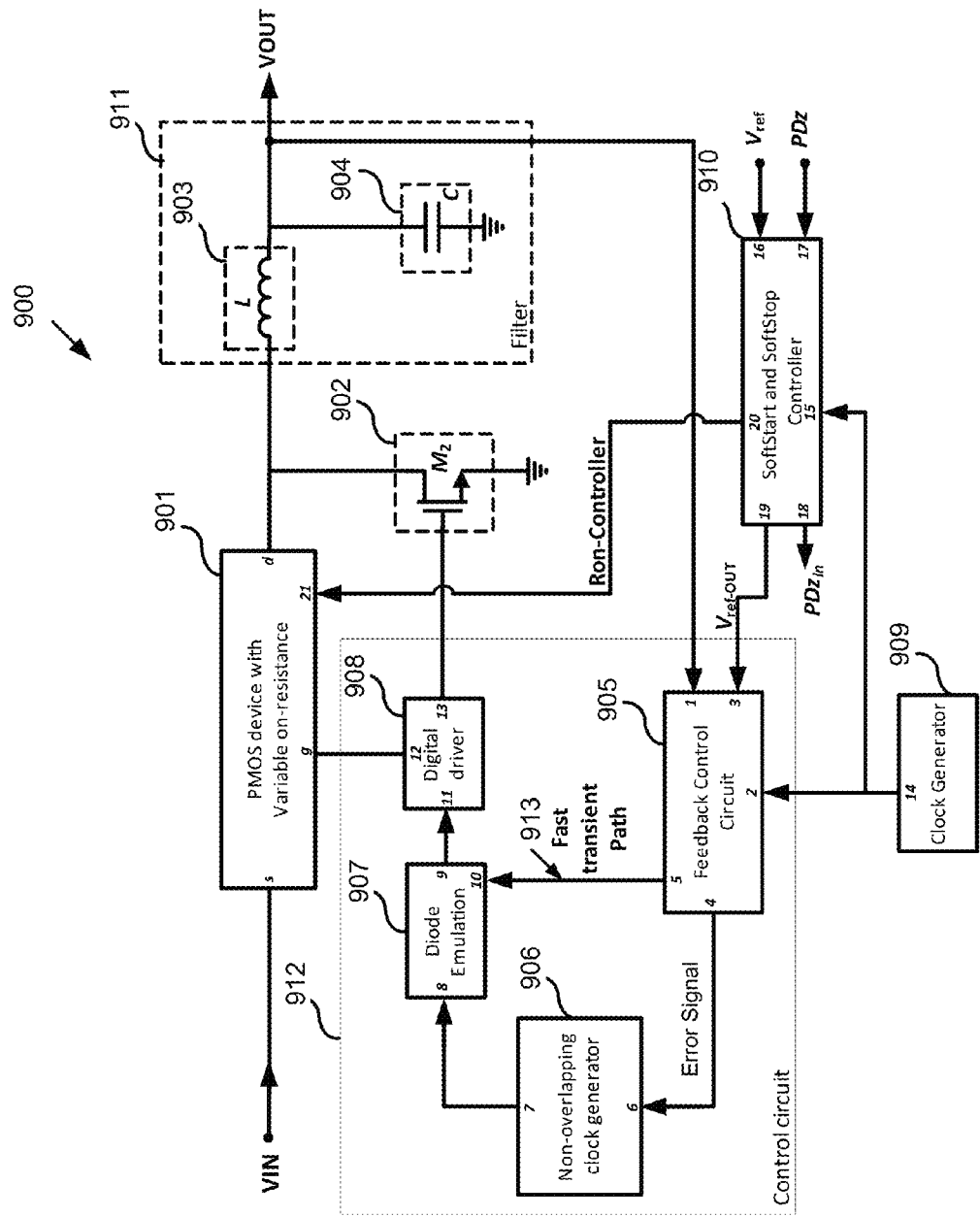
FIG. 9 shows a block diagram of an improved DC-DC switching voltage regulator in accordance with one or more embodiments of the invention.

FIG. 9 shows a schematic block diagram of an improved DC-DC switching voltage regulator (900). In one or more embodiments of the invention, one or more of the modules and elements shown in FIG. 9 may be omitted, repeated/ substituted. Accordingly, embodiments of the invention should not be considered limited to the specific arrangements of modules shown in FIG. 9.

In one or more embodiments, the improved DC-DC switching voltage regulator (900) includes a first MOS power switching device (901) and is configured to generate a VOUT output from a VIN input. The MOS power switching device (901) includes a number of smaller MOS devices connected in parallel.

In one or more embodiments, the improved DC-DC switching voltage regulator (900) includes a feedback control circuit (905) coupled to the first MOS power switching device (901) and is configured to adjust a duty cycle of a gate control signal supplied to the first MOS power switching device (901) for regulating a voltage level of the VOUT output. In one or more embodiments, the duty cycle is adjusted based on a difference between a ramped reference voltage signal (e.g., $V_{ref\text{-}OUT}$) and a sample of the voltage level of the VOUT output.

In one or more embodiments, the improved DC-DC switching voltage regulator (900) includes a soft-start/soft-stop (SS) controller coupled to the first MOS power switching device (901) and the feedback control circuit (905), and is configured to generate the ramped reference voltage signal (e.g., $V_{ref\text{-}OUT}$) that has a controlled ramp-up rate and a controlled ramp-down rate during a start-up time period and a shut-down time period, respectively, of the improved DC-DC switching voltage regulator (900).

In one or more embodiments, the SS controller is further configured to generate a control signal (Ron-Controller) to control a variable on-resistance (Ron) of the first MOS power switching device (901). In one or more embodiments, the Ron control signal is configured to turn ON each of the smaller MOS devices in a first sequential order during the start-up time period of the improved DC-DC switching voltage regulator (900), and turn OFF each of the smaller MOS devices in a second sequential order during the shut-down time period of the improved DC-DC switching voltage regulator (900).

In one or more embodiments, the DC-DC switching voltage regulator (900) includes additional components, such as a second MOS power switching device (902) to operate in tandem with the first MOS power switching device, a diode emulation circuit (907), and various clock generator circuits and driver circuit (908). Details of the operation of the circuit (900) are described below.

As shown in FIG. 9, the DC-DC switching voltage regulator (900) includes the PMOS device (901), the NMOS device (902), the inductor (903), the capacitor (904), the clock generator (909), the soft-start and soft-stop controller (910), and the control circuit (912), which in turn includes the feedback control circuit (905), the fast transient path (913), the non-overlapping clock generator (906), the diode emulation circuit (907), and the digital driver (908). In one or more embodiments, the soft-start and soft-stop controller (910) is implemented as the example circuit (700) shown in FIG. 7 above.

In one or more embodiments, the feedback control circuit (905) and the fast transient path (913) form an extra feedback loop to increase the discharge rate during shut-down. Specifically, the extra feedback loop traverses the feedback control circuit (905), the fast transient path (913), the digital driver (908), the PMOS device (901), the NMOS device (902), and the inductor (903). This extra feedback loop creates a fast leakage path through the NMOS device (902) during transient activities. The fast transient path provides a control signal from the feedback control circuit (905) to disable the diode emulation circuit (907) when needed.

In one or more embodiments, the soft-start/soft-stop controller (910) is configured to control the DC-DC switching voltage regulator (900) to slowly turn on during start-up and avoid voltage overshoots. Further, the soft-start/soft-stop controller (910) is configured to control the output node VOUT to slowly ramp down during shut-down. Specifically, the soft-start/soft-stop circuit (910) generates the signals at its outputs (18, 19, 20) required at start-up and shut-down to guarantee smooth performance. In particular, the soft-start/soft-stop circuit (910) generates the Ron-Controller signal at its output (20) to adjust the variable on-resistance of the PMOS device (901) as a modulating parameter that controls the peak currents flowing into the output node VOUT through the output inductor (903). In addition, the soft-start/soft-stop circuit (910) generates PDzin at its output (18) from PDz at its input (17) to be used by other circuit blocks. Further, the soft-start/soft-stop controller (10) generates a voltage $V_{ref\text{-}OUT}$ at its input (19) which ramps up to reach the voltage level $V_{ref}$ at its input (16) during start-up, and ramps down from $V_{ref}$ to zero during shut-down. In one or more embodiments, the soft-start/soft-stop controller (910) is implemented as the example circuit (700) depicted in FIG. 7. Those skilled in the art, with the benefit of this disclosure, will appreciate that other circuit implementations may also be used without deviating from the spirit of the invention.

Generally, the PMOS device (901) and the NMOS device (902) act as the switching element to determine the average voltage value of the output node VOUT. Their drain terminals are connected to an LC filter (911) composed of the inductor (903) and capacitor (904) to filter out high-frequency switching effects and smooth out the voltage level of the output node VOUT. The feedback control circuit (905) compares the output node VOUT voltage level at its input (1) and a reference voltage $V_{ref\text{-}OUT}$ at its input (3) to generate an error signal at its output (4) that has a signal level proportional to the comparison result. This is a signal with variable duty cycle derived from an internal clock generated by the clock generator (909). The duty cycle (e.g., the percentage of signal high time over the signal period) is proportional to the difference between VOUT voltage level at its input (1) and a reference voltage $V_{ref\text{-}OUT}$ at its input (3). The non-overlapping clock generator (906) uses this error signal at its input (6) to generate non-overlapping clock signals at its output (7) to control both the PMOS device (901) and the NMOS device (902). These non-overlapping clock signals pass through the diode emulation circuit (907) to maintain the NMOS device (902) in an OFF state during any discharge activity of the output node VOUT. A digital driver (908) is used to optimize the driving capability of the PMOS device (901) and the NMOS device (902) in terms of speed and power consumption.

FIG. 11 shows a portion of the circuit (900) depicted in FIG. 9 in more details. Specifically, the circuit (1100) depicted in FIG. 11 includes a schematic block diagram of an example variable on-resistance circuit (901a) to implement the PMOS power device (901) depicted in FIG. 9 to control the output current during start-up/shut-down. In one or more embodiments of the invention, one or more of the modules and elements shown in FIG. 11 may be omitted, repeated/substituted. Accordingly, embodiments of the invention should not be considered limited to the specific arrangements of modules shown in FIG. 11.

Figure 10:
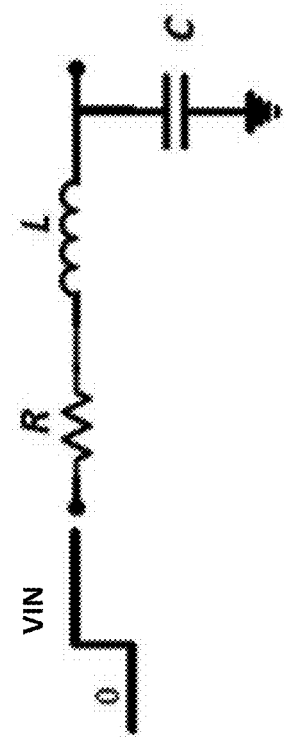
FIG. 10 shows the RLC model of the improved DC-DC switching voltage regulator, shown in FIG. 9, during start-up.

As shown in FIG. 11, during start-up, the variable on-resistance circuit (901a), the inductor (903), the capacitor (904), and the action of turning on the variable on-resistance circuit (901a) can be modeled as an RLC circuit with a voltage step VIN at the RLC circuit input as shown in FIG. 10. The governing equation of this RLC circuit is given as:

$$\frac{d^2 i(t)}{dt^2} + \frac{R}{L}\frac{di(t)}{dt} + \frac{1}{LC}i(t) = VIN \tag{1}$$

For typical inductance and capacitance values used in DC-DC switching voltage regulators to achieve reasonable power efficiency, where the resistance value is sufficiently low, the RLC circuit at start up is an under-damped system that is governed by the following equations.

$$i(t)=C(dv(t))/dt=cd/dt[e^{\uparrow}(-\alpha t)(k_1 1\, Cos(\beta t)+k_1 1\, sin(\beta t))] \tag{2}$$

Where, $$\alpha = \frac{R}{2L},\ k_1 = VIN,\ k_2 = \frac{\alpha}{\beta} VIN,\ \beta = \sqrt{\frac{1}{LC} - \alpha^2},$$

and VIN is the target input voltage level.

It can be shown from equation (2) that for specific values of L and C, the smaller the value of R in the RLC circuit, the smaller the value of $\alpha$. As $\alpha$ decreases relative to the natural frequency $$\left(\sqrt{\frac{1}{LC}}\right),$$

the RLC circuit will perform towards an under-damped behavior leading to a higher peak current in response to a step response input (e.g., during start-up).

In a typical DC-DC switching voltage regulator, the choice of switching device ON resistance Ron is mainly dictated by the performance requirements, for example the power efficiency is highly affected by the Ron. Hence, optimizing the Ron value for peak current purposes is not possible since it affects other parameter metrics. In one or more embodiments of the invention, different Ron values are used during the voltage regulator operation. At steady state, the Ron is set to the value suitable for normal circuit operation to meet the performance requirements. During start up, Ron is set to higher values to limit the peak current to be within an acceptable range. In one or more embodiments, variable Ron is implemented by splitting the voltage regulator switching device into smaller parallel switches and enable/disable some of them at different times. An example is illustrated in FIG. 11. In one or more embodiments, variable Ron is implemented by modulating the gate voltage of the switching device according to the required Ron, hence using the gate voltage control circuit of the switching device as the Ron controller.

Further as shown in FIG. 11, the variable on-resistance circuit (901a) is a current-limiting circuit based on modulating the effective on-resistance Ron of the parallel power devices $M_1$ through $M_4$. In the normal operation where the on-resistance is preferably at its minimum for maximum power efficiency, all of the parallel power devices $M_1$ through $M_4$ are connected together to produce the lowest possible on-resistance. From the analysis of an RLC circuit model with such small resistance, the peak current at start-up would be extremely high. In one or more embodiments, a subset of the parallel power devices $M_1$ through $M_4$ are decoupled (i.e., switched OFF) in order to increase the effective on-resistance to reduce the resulting peak current during both start-up and shut-down. Specifically, VCONT1, VCONT2, and VCONT3 are the control signals that adjust the Ron at different time steps to limit the peak rush-in current within the acceptable range.

Although the example circuit (1100) depicted in FIG. 11 only employs the Ron modulation technique to implement the variable on-resistance circuit (901a) for the pull-up PMOS device (901) of the voltage regulator circuit (900) depicted in FIG. 9, the same technique may also be implemented for the pull-down NMOS device (902) to reduce the shut-down rush-in current. Although a specific number of parallel power devices (e.g., four devices $M_1$ through $M_4$) is depicted in FIG. 11, a different number of parallel power devices may be used.

Figure 12:
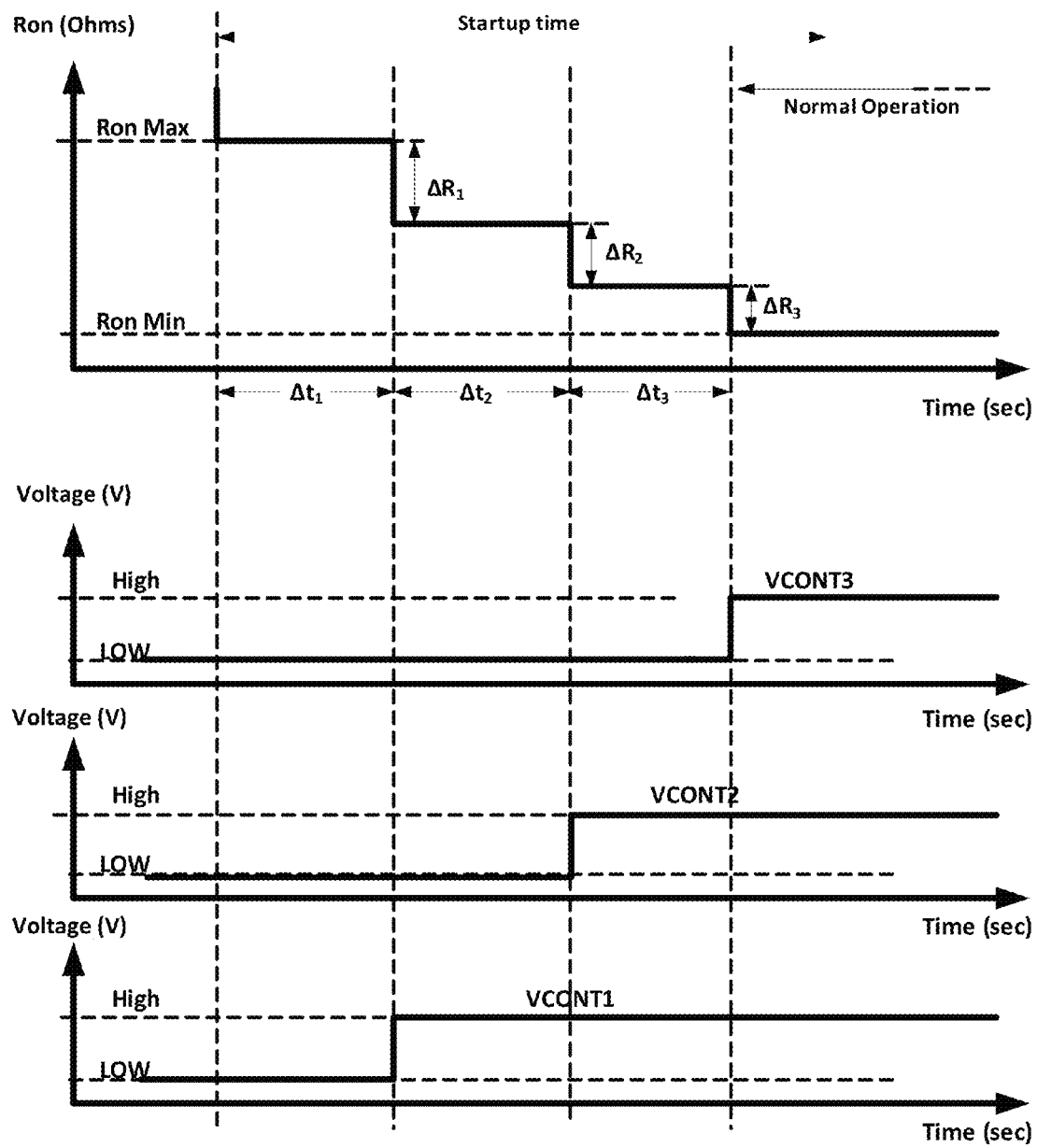
FIG. 12 shows an example timing diagram in accordance with one or more embodiments of the invention.

FIG. 12 shows example timing diagrams of the control signals VCONT1, VCONT2, VCONT3, and the corresponding Ron modulation for the example circuit (1100) depicted in FIG. 11 above. As shown in FIG. 12, $\Delta t_1$, $\Delta t_2$, $\Delta t_3$, $\Delta R_1$, $\Delta R_2$, and $\Delta R_3$, are design parameters that are determined as a function of the specified maximum overshoot. It can be seen from these example timing diagrams that Ron is adjusted from Ron Max to Ron Min in three separate steps in response to incrementally applying the control signals VCONT1, VCONT2, and VCONT3 at three specific time points during the start-up time period.

Generally, issues of fast ramp, overshoot and undershoot for output voltage and current at startup or shutdown exist in both LDO and DC-DC switching voltage regulators. Various techniques described above using either LDO or DC-DC switching voltage regulator as examples can be used in both types of voltage regulators. In particular, although a Buck converter is used as the example circuit in the discussion above, embodiments of the invention are equally applicable to other types of DC-DC switching voltage regulators, such as Boost converter, Buck-Boost converter, etc.

Each of the above two discussed techniques (i.e., using $V_{ref}$ ramp through the soft-start/soft-stop circuit, and using Ron modulation of the power device(s)) can be used either alone or concurrently with the other technique. Using them in combination further improves the startup/shutdown performance. Various relative timing sequences can be followed. In one example, RON modulation starts with the highest possible Ron and remains fixed for the whole $V_{ref}$ ramp. After $V_{ref}$ ramp reaches its final value, Ron starts dropping by one or more steps. The advantage of this scheme is to have a large Ron during the regulator loop engagement (time needed from startup instant till the loop starts its regulating function). This limits any random peaks (voltage or current at the output node). In another example, the Ron modulation is started from Ron maximum to Ron minimum while $V_{ref}$ is held on its first step (e.g., a low $V_{ref}$ value). This is followed by the complete $V_{ref}$ ramp. This scheme speeds up VOUT ramp as it ramps with a lower Ron of the PMOS and NMOS switching devices. In summary, relative timing is a design metric that can be chosen for optimum performance.

In one or more embodiments, the aforementioned variable Ron control signal turns on each of the smaller MOS switches in the MOS switching device of a DDSVR synchronously with respect to the incrementing of the n-bit count value for generating the ramped reference voltage. Similarly, the variable Ron control signal turns off each of the smaller MOS switches synchronously with respect to the decrementing of the n-bit count value. In one or more embodiments, the variable Ron control signal is generated based on the clock signal that controls the up/down counter to increment and decrement the n-bit count value.

Figure 3:
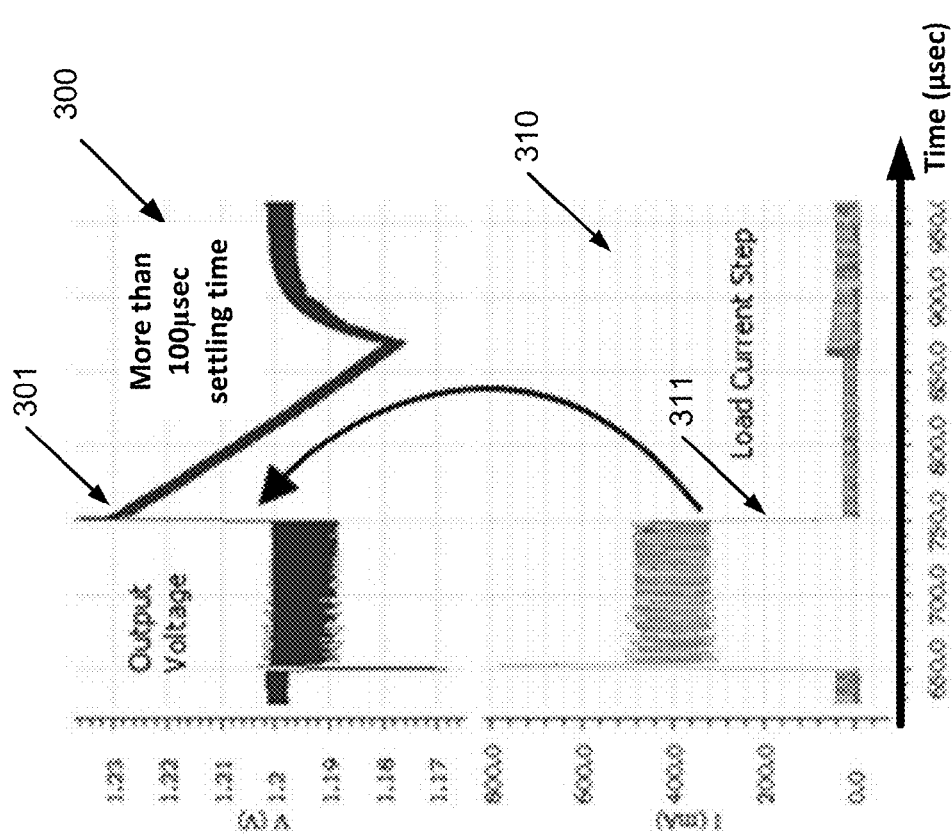
FIG. 3 shows a simulation result of a prior art DC-DC switching voltage regulator showing the output node voltage in a negative transient load behavior without a fast discharging path.
Figure 4:
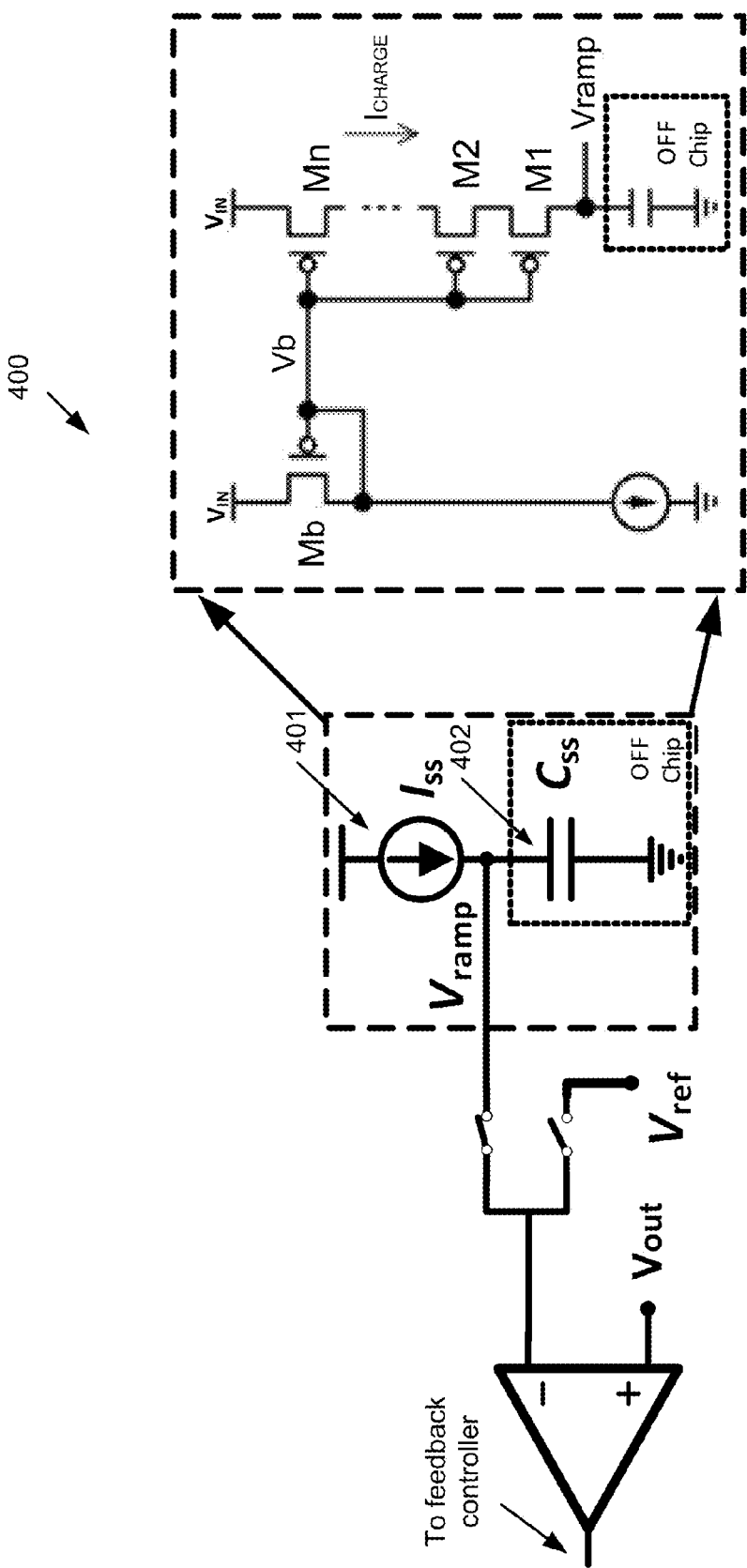
FIG. 4 shows a schematic of a prior art analog circuit to control the $V_{ref}$ signal ramp-up using a control circuit with an external (off-chip) capacitor.
Figure 5:
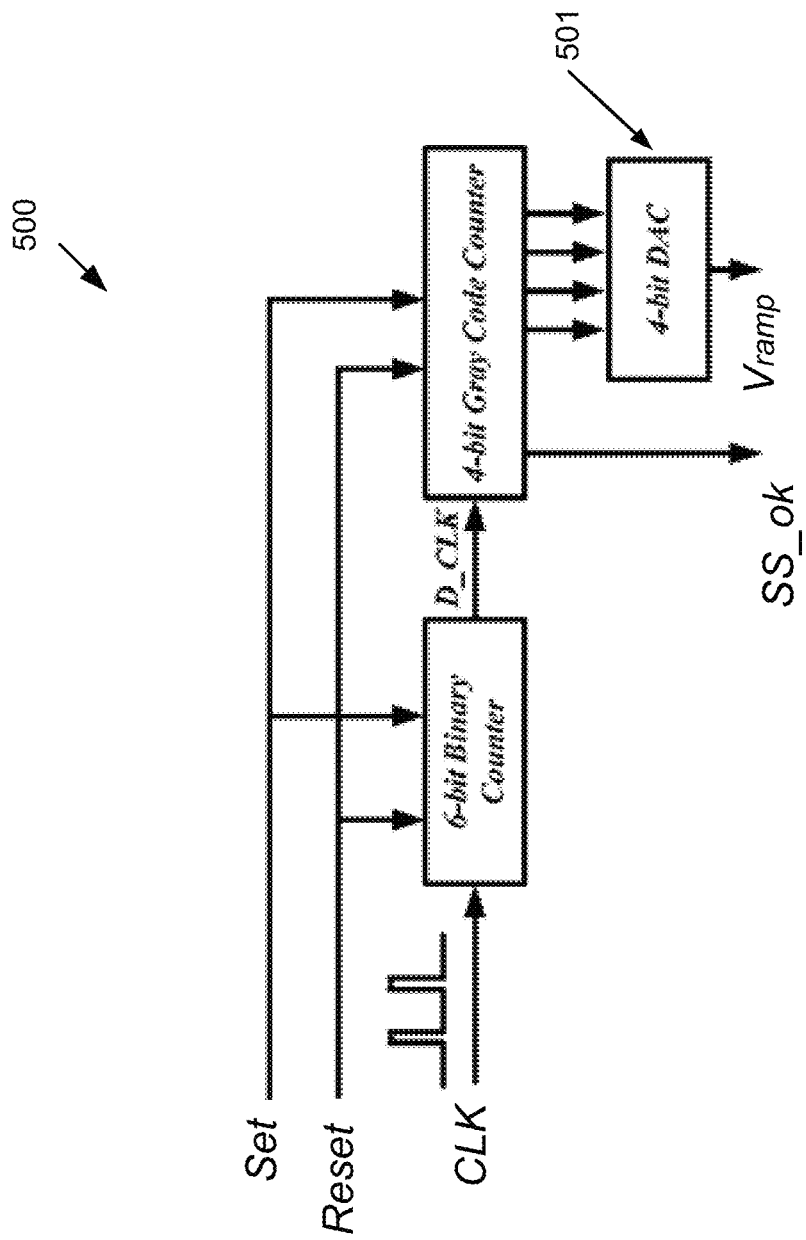
FIG. 5 shows a schematic of a prior art digital circuit to control the $V_{ref}$ signal ramp-up using an internal (on-chip) control circuit.

One more critical specification in DC-DC switching voltage regulators is the settling time during transient activities. During any transient behavior that leads to voltage overshoot (e.g., negative step transient load), the voltage settles back to its final value with a speed proportional to its leakage path strength and inversely proportional to the load capacitor value. As shown in FIG. 3, this can take a long time. For large overshoots, this may not be tolerated by most applications. This can be solved by one or more embodiments of this invention. An extra feedback path (i.e., Ffast transient path) is created as shown in FIG. 9. The extra feedback path detects the output voltage overshoots using a voltage peak detector (inside the feedback control circuit (905)). The accuracy of the voltage peak detector determines the amount of voltage overshoot to be tolerated. In most high-efficiency DC-DC switching voltage regulators, a diode emulation circuit is used instead of a real diode to reduce the losses and maintain a blocked path from the output node to ground. In one or more embodiments, the output of the voltage peak detector is used to disable the diode emulation circuit (when ACTIVE) to allow for a fast leakage path during this event only.

The accuracy of turning the diode emulation circuit on and off is highly dependent on the application. Applications with less current activities will rarely experience this ON-OFF procedure, thus inaccuracy in turning the diode emulation circuit on and off will not affect its overall efficiency. On the other hand, applications with high current activities require high accuracy, otherwise cumulative error build up results in a significant loss in its overall power efficiency.

Figure 13:
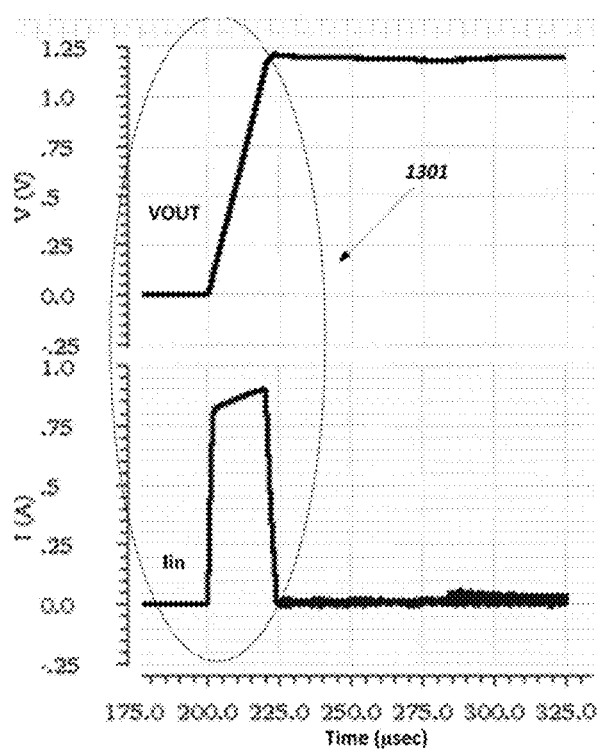
FIGS. 13-15 show example simulation results of the improved DC-DC switching voltage regulator in accordance with one or more embodiments of the invention.
Figure 14:
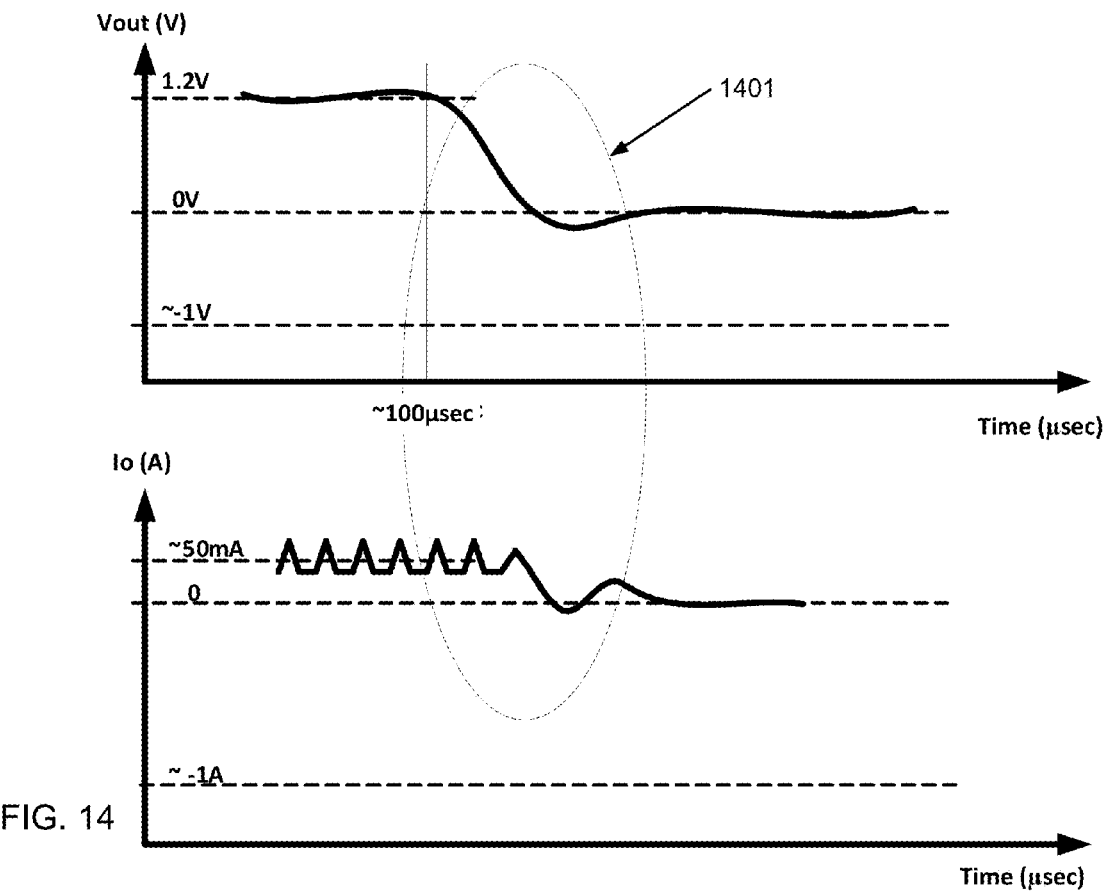
Figure 15:
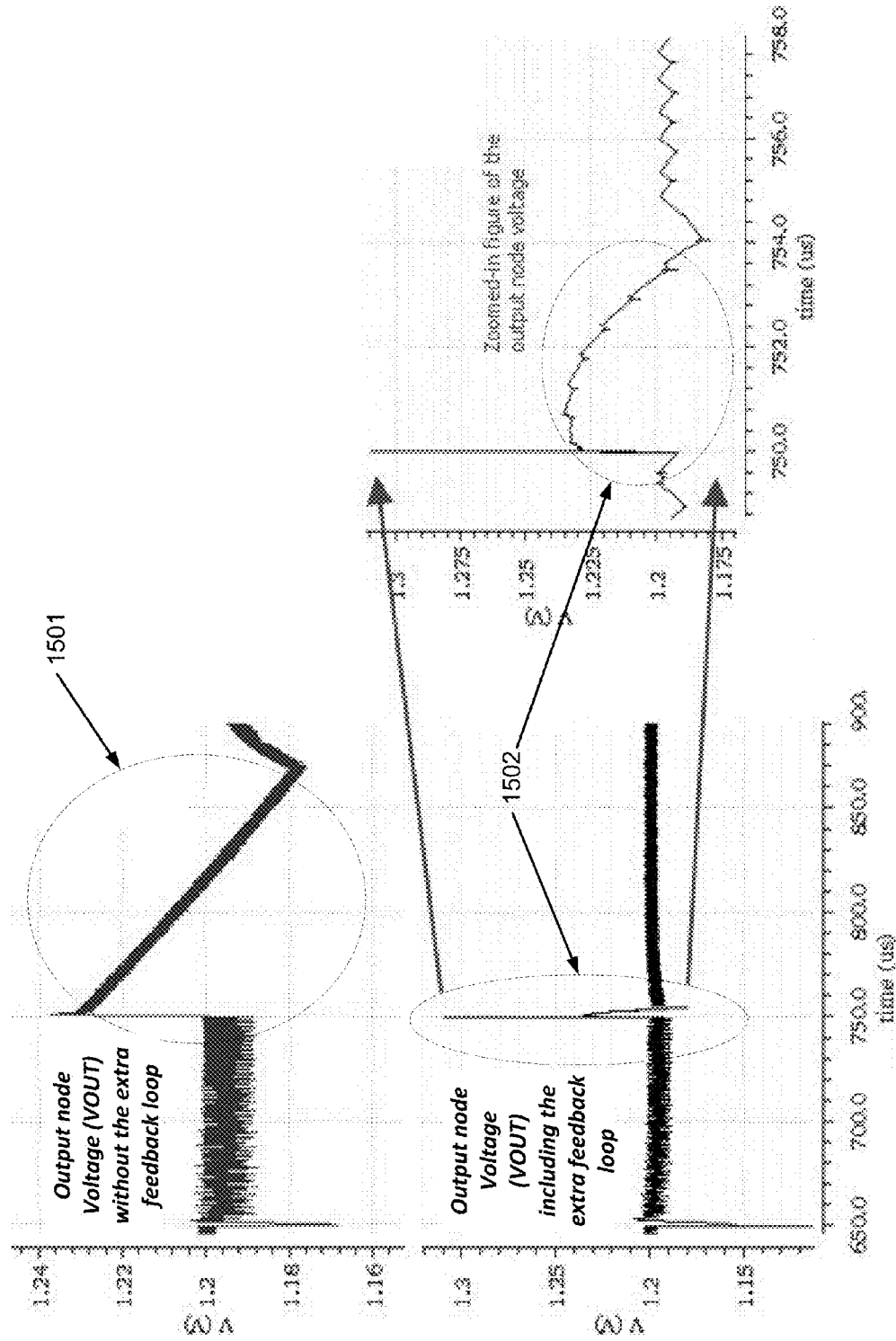

Simulations show that the techniques and example circuits described above effectively reduce the voltage ramp speed, voltage overshoot, current overshoot, and current undershoot. FIG. 13 shows simulation results for the start-up process using a clock frequency of 1 MHz. The start-up time (1301) is proportional to the clock period. During the start-up time (1301), no significant overshoot or undershoot is noticeable. FIG. 14 shows simulation results for a shut-down process using a clock frequency of 1 MHz. Similarly, the shut-down time (1401) is controlled by the clock frequency. During the shut-down time (1401), no significant overshoot or undershoot is noticeable. FIG. 15 shows simulation results of the negative transient load regulation with the aforementioned extra feedback loop (i.e., fast transient path). As shown, the settling time (1501) of over 150 μsec in the top curve (for a regulator without the extra feedback loop) is reduced to the settling time (1502) of less than 3 μsec in the bottom curve (for a regulator with the extra feedback loop).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A soft-start/soft-stop (SS) controller for a voltage regulator comprising:
   a power up/down detector configured to perform at least one selected from a group consisting of:
      detecting a power on condition of the voltage regulator to determine a start-up time period; and
      detecting a power off condition of the voltage regulator to determine a shut-down time period; and a ramped reference voltage signal generator configured to perform at least one selected from a group consisting of:
  increasing a voltage level of a ramped reference voltage signal using a pre-determined ramp-up rate during the start-up time period; and
  decreasing the voltage level of the ramped reference voltage signal using a pre-determined ramp-down rate during the shut-down time period,
wherein the ramped reference voltage signal is supplied to the voltage regulator for controlling an output voltage level of the voltage regulator,
wherein the ramped reference voltage signal generator comprises:
  an up/down counter coupled to the power up/down detector and configured to:
    increment, based on a clock signal, an n-bit count value starting from a pre-determined minimum value and ending at a pre-determined maximum value, wherein the incrementing is initiated in response to the power up detector detecting the power on condition of the voltage regulator; and
    decrement, based on the clock signal, the n-bit count value starting from the pre-determined maximum value ending at the pre-determined minimum value, wherein the decrementing is initiated in response to the power down detector detecting the power of condition of the voltage regulator;
  a programmable voltage divider circuit coupled to the up/down counter and configured to generate a voltage ramp that:
    increases in proportion to the n-bit count value when the n-bit count value increments; and
    decreases in proportion to the n-bit count value when the n-bit count value decrements; and
  a select-minimum circuit coupled to the programmable voltage divider circuit and a DC reference voltage source, and configured to:
    generate a ramped reference voltage signal by selecting a time dependent minimum of the voltage ramp and the DC reference voltage,
wherein the ramped reference voltage signal follows the voltage ramp until clipping at the DC reference voltage.

2. The SS controller of claim 1,
wherein the programmable voltage divider circuit comprises a resistor ladder network having a plurality of ladder outputs,
wherein the voltage ramp is generated by selecting one of the plurality of ladder outputs based on the n-bit count value, and
wherein a static current path is turned off to reduce static power consumption when the n-bit count value is held at the pre-determined maximum value.

3. The SS controller of claim 1,
wherein the up/down counter is disabled to reduce static power consumption when the n-bit count value is held at the pre-determined maximum value.

4. The SS controller of claim 1, wherein the power up/down detector is further configured to:
  generate a disable signal that turns off the voltage regulator in response to detecting a complete output node discharge condition of the voltage regulator.

5. A soft-start/soft-stop (SS) controller for a voltage regulator comprising:
  a power up/down detector configured to perform at least one selected from a group consisting of:
    detecting a power on condition of the voltage regulator to determine a start-up time period; and
    detecting a power off condition of the voltage regulator to determine a shut-down time period;
  a variable on-resistance (Ron) controller configured to generate a Ron control signal to control a variable Ron of a MOS power switching device in the voltage regulator, wherein the MOS power switching device comprises a plurality of MOS switches; and
  a ramped reference voltage signal generator configured to perform at least one selected from a group consisting of:
    increasing a voltage level of a ramped reference voltage signal using a pre-determined ramp-up rate during the start-up time period; and
    decreasing the voltage level of the ramped reference voltage signal using a pre-determined ramp-down rate during the shut-down time period,
wherein the ramped reference voltage signal is supplied to the voltage regulator for controlling an output voltage level of the voltage regulator,
wherein the Ron control signal is configured to:
  turn on each of the plurality of MOS switches in a first sequential order during the start-up time period of the voltage regular; and
  turn off each of the plurality of MOS switches in a second sequential order during the shut-down time period of the voltage regulator,
wherein the variable Ron control signal turns on each of the plurality of MOS switches synchronously with respect to the incrementing of the n-bit count value, and
wherein the variable Ron control signal turns off each of the plurality of MOS switches synchronously with respect to the decrementing of the n-bit count value.

6. The SS controller of claim 5,
wherein the variable Ron control signal is generated based on the clock signal that controls the up/down counter to increment and decrement the n-bit count value.

7. A method to reduce output overshoots and undershoots in a voltage regulator, comprising:
  incrementing, based on a clock signal, an n-bit count value starting from a pre-determined minimum value and ending at a pre-determined maximum value, wherein the incrementing is initiated in response to detecting a power on condition of the voltage regulator;
  decrementing, based on the clock signal, the n-bit count value starting from the pre-determined maximum value and ending at the pre-determined minimum value, wherein the decrementing is initiated in response to detecting a power off condition of the voltage regulator;
  generating a voltage ramp that:
    increases in proportion to the n-bit count value when the n-bit count value increments; and
    decreases in proportion to the n-bit count value when the n-bit count value decrements;
  generating an up/down ramped reference voltage signal by selecting a time-dependent minimum of the voltage ramp and a DC reference voltage, wherein the up/down ramped reference voltage signal follows the voltage ramp incrementing until clipping at the DC reference voltage and follows the voltage ramp decrementing until clipping at a minimum voltage; and
  supplying the up/down ramped reference as a reference voltage to the voltage regulator for controlling an output voltage level of the voltage regulator.

8. The method of claim 7,
wherein the ramped reference is supplied as a reference voltage to at least one selected from a group consisting of an error amplifier of a LDO linear voltage regulator and a feedback control circuit of a DC-DC switching voltage regulator.

\* \* \* \* \*